March 27, 1934.  F. T. BAKER  1,952,110
LUBRICATING APPARATUS
Filed Nov. 3, 1930
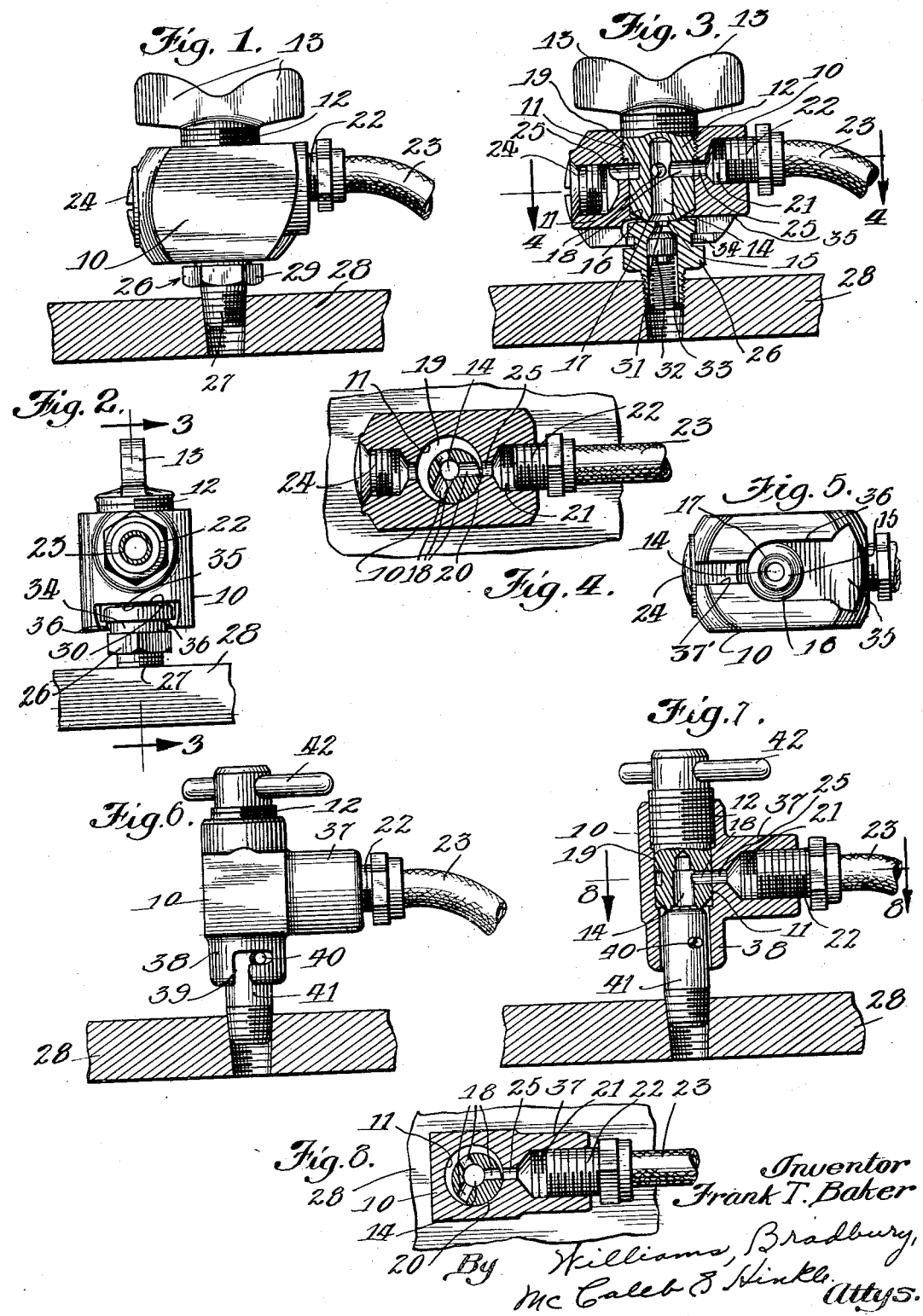
Inventor
Frank T. Baker
By Williams, Bradbury,
McCaleb & Hinkle,
Attys.

Patented Mar. 27, 1934

1,952,110

UNITED STATES PATENT OFFICE 1,952,110

LUBRICATING APPARATUS

Frank T. Baker, Fairfield, Ala., assignor to Alemite Corporation, Chicago, Ill., a corporation of Delaware Application November 3, 1930, Serial No. 492,910

5 Claims. (Cl. 284—17)

This invention relates to lubricating apparatus, and particularly to couplings adapted to cooperate with lubricant receiving nipples or fittings.

One of the objects of the invention is to provide a coupling adapted to be secured in a novel manner upon a lubricant receiving nipple, while supplying lubricant thereto.

A further object of the invention is to provide a coupling carrying a threaded plug which is adapted to be securely seated upon a lubricant receiving nipple while lubricant is being supplied to the nipple through a bore in the plug.

A further object of the invention is to provide a coupling of this type comprising a plug adjustably mounted on a suitable body member so as to be capable of engaging tightly a lubricant receiving nipple, the movement of the plug serving to control the supply of lubricant thereto.

Other objects and advantages as well as capabilities of the invention will appear from the following description of the preferred embodiments thereof, taken in connection with the accompanying drawing, in which:—

Figure 1 is a side elevation of a coupling embodying the invention, mounted on a lubricant receiving nipple.

Fig. 2 is an end view thereof.

Fig. 3 is a vertical cross section taken on the line 3—3 of Fig. 2.

Fig. 4 is a horizontal section taken on the line 4—4 of Fig. 3.

Fig. 5 is an inverted plan of the coupling shown in Figs. 1 to 4, detached from the lubricant nipple.

Fig. 6 is a side elevation of a further embodiment of the invention.

Fig. 7 is a central vertical cross section of the embodiment of the invention shown in Fig. 5, and Fig. 8 is a horizontal cross section taken on line 8—8 of Fig. 7.

Referring to the drawing, and particularly to Figs. 1 to 5, the coupling comprises a body or block 10 which is provided with a vertical bore 11, the upper portion of which is internally threaded, and the lower portion of which is of somewhat reduced diameter.

The bore 11 receives a plug 12 of corresponding form, the lower portion thereof having a sliding fit in the lower cylindrical portion of the bore 11. The upper portion of the plug 12 is threaded to cooperate with the upper threaded portion of the bore 11. At its upper end the plug 12 carries wings 13 whereby it may be rotated within the bore 11, this rotation being accompanied by vertical movement due to cooperation between the threaded portions of the bore 11 and the plug 12.

The plug 12 is provided with an axial bore 14 which extends from its lower end as shown in Fig. 3. The lower end of the bore 14 is flared as shown at 15, and the lower end of the plug 12 is of frustro-conical form as indicated at 16, so as to provide a relatively small annular bearing surface 17, which is adapted to make a sealed joint with a lubricant nipple as will be hereinafter described. The plug 12 is provided with one or more radial bores 18 which extend from the bore 14 into a horizontal groove 19 which is provided in the plug 12 around part of its circumference, leaving a cylindrical portion 20 of the plug between its ends.

The body or block 10 is provided with one or more tapped openings 21 which are adapted to receive a hose coupling 22 which is connected to a hose 23 by which lubricant under pressure may be supplied. As shown in the drawing, the hose coupling 22 is secured to one of the tapped openings 21, the other tapped opening being closed by a screw 24. Ducts 25 extend from the tapped openings 21 into the cylindrical portion of the bore 11 at a position which enables them to cooperate with the groove 19, in the manner hereinafter described, when the plug 12 is located to cooperate with a lubricant receiving nipple.

Means are provided for positioning and securing a lubricant receiving nipple with relation to the plug 12 so that the annular surface 17 makes contact with the face of the nipple and encloses the lubricant opening of the nipple so that it may receive lubricant from the bore 14. Such means will naturally depend upon the particular kind of nipple employed. The nipple 26 illustrated in Figs. 1 to 3 comprises a hollow threaded stem 27 whereby it may be mounted upon suitable mechanism 28 which is to be supplied with lubricant. It also comprises a hexagonal or other suitable portion 29 whereby it may be engaged by a wrench. At its outer end it is provided with a face 30 having a lubricant inlet 31 which is normally closed by a valve 32 which is pressed outwardly by a spring 33. Adjacent the face 30 the nipple is provided with a circumferential groove 34. The underside of the body 10 is provided with an undercut slot 35 which is open at one end as shown in Fig. 5. The slot provides flanges 36 which are adapted to enter the groove 34 as shown in Fig. 2, the nipple being inserted through the open end of the slot by suitable sliding movement of the body 10. The flanges 36 curve inwardly at the inner end of the slot 35 to provide stops for the nipple 26 and locate it in alignment with the plug 12. In order to provide for escape of dirt, lubricant, etc. which may be found in the way of the nipple, it is preferred to provide in the lower face of the body 10, a small slot 37' which opens into the slot 35.

In operation the open end of the slot 35 is applied to the nipple 26 so as to present the ends of the flanges 36 to the groove 34. The coupling is then drawn to the position shown in Fig. 3. The hose 23 may be connected to a source of lubricant under pressure, the lubricant being prevented from discharging through the effective duct 25 by contact of the cylindrical portion 20 of the plug 12 therewith. When the coupling and nipple are located in cooperating position, the plug 12 is rotated by means of the wings 13 so as to press the annular surface 17 against the face 30 of the nipple 26. This rotation brings the groove 19 into register with the effective duct 25 and lubricant under pressure is supplied from the hose 23 through the bores 18 and 14 to the lubricant inlet of the nipple 26. The valve 32 is opened by this pressure and the lubricant is supplied to the desired position of the machine 28. After sufficient lubricant is supplied, the plug 12 is rotated in the opposite direction slightly so as to bring the cylindrical portion 20 of the plug 12 into register with the effective duct 25, thus shutting off the supply. This same movement releases the plug from contact with the nipple 26 so that the same may be disengaged from the coupling by a sliding movement of the latter.

The modification shown in Figs. 6, 7 and 8 is generally similar and corresponding parts are designated by the same reference numerals. In this modification the body 10 is smaller in size and the threaded opening 21 is provided in a lateral tubular extension 37. The bore 11 continues below the end of the plug 12 so as to provide a skirt 38 which is provided with bayonet joint slots 39 for the reception of opposed pins 40 carried by a conventional form of lubricant nipple 41. Instead of the wings 13, the upper end of the plug 12 may carry a horizontal rod 42 which projects on either side thereof to provide means whereby the plug may be rotated. This embodiment of the invention is employed in the same manner as the modification first described above.

Although the invention has been disclosed in connection with the specific details of preferred embodiments thereof, it must be understood such details are not intended to be limitative of the invention, except insofar as set forth in the accompanying claims.

I claim:

1. A coupling comprising a body, a plug threadedly mounted therein, said plug having manually engageable means for rotating it, means provided on the body for engaging a lubricant receiving nipple in alignment with the plug, a duct in the body adapted to receive lubricant under pressure, said plug being provided with a bore adapted to communicate with said duct, said nipple being provided with a lubricant inlet adapted to be brought into registry with the bore, said plug being movable axially relative to said body by rotation to make a seal with the nipple.

2. A coupling comprising a body adapted to engage a lubricant receiving nipple having a relatively flat end face, a plug threadedly mounted therein and having a bore adapted to supply lubricant to the nipple, the plug having a relatively sharp edged annular bearing surface adapted to surround the nipple inlet and make a tight joint with the nipple, a duct in the body adapted to receive lubricant under pressure, the plug being provided with a groove adapted to register therewith in certain positions of the plug and not in others, and a duct in the plug extending from the groove to the bore, the groove and the duct in the body being in registry when the plug is in sealing relation to the nipple and being out of registry when the plug is rotated to a predetermined different position.

3. A coupling comprising a body provided with a bore, rigid means carried by the body for engaging a lubricant receiving nipple adjacent the lower end of the bore and in alignment therewith, a plug having an axial bore, threadedly mounted in the bore of the body, a duct in the body adapted to receive lubricant under pressure, a duct in the plug communicating with the bore thereof and adapted to communicate with the duct of the body in certain positions but not in certain other positions, and exterior means whereby the plug may be rotated to advance same to make a seal with the nipple, such sealing position providing open communication between the duct of the body and the bore of the plug.

4. A coupling comprising a body provided with a bore having an upper threaded portion and a lower cylindrical portion, means carried by the body for engaging a lubricant receiving nipple adjacent the lower end of the bore and in alignment therewith, a plug having an axial bore adapted to receive lubricant, threadedly mounted in the bore of the body and having a cylindrical portion slidably fitting in the cylindrical portion thereof, a duct in the body adapted to receive lubricant under pressure, the plug being provided with a circumferential groove in its cylindrical portion extending part way around same, ducts in the plug between the groove and its bore, and manually engageable means for rotating the plug whereby it may be advanced to make a seal with the nipple, such sealing position providing open communication between the groove of the plug and the duct in the body.

5. A coupling comprising a body constructed and arranged to engage a lubricant receiving nipple, a plug threaded therein and having a bore adapted to conduct lubricant to the nipple, said plug having manually engageable means by which it may be rotated and an annular sharp edged bearing surface adapted to surround the inlet of the nipple and make a tight joint therewith when the plug is screwed into the body toward the nipple, said body having a duct adapted to receive lubricant under pressure, and being provided with an annular groove extending only partially around the periphery of the plug and adapted to communicate with said duct when the plug is rotated to one position and to be out of communication with said duct when the plug is rotated to a different annular position, and a duct in the plug extending from the groove to the bore therein.

FRANK T. BAKER.